United States Patent
Horn et al.

(10) Patent No.: US 12,418,110 B2
(45) Date of Patent: Sep. 16, 2025

(54) WIRELESS COMMUNICATIONS USING MULTIPLE ANTENNA ARRAYS AND A LENS ARRAY

(71) Applicant: QUALCOMM Incorporated, San Diego, CA (US)

(72) Inventors: Idan Michael Horn, Hod Hasharon (IL); Yehonatan Dallal, Kfar Saba (IL); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/600,550

(22) Filed: Mar. 8, 2024

(65) Prior Publication Data
US 2024/0213672 A1   Jun. 27, 2024

Related U.S. Application Data

(62) Division of application No. 17/315,941, filed on May 10, 2021, now Pat. No. 11,962,098.
(Continued)

(51) Int. Cl.
*H01Q 3/36* (2006.01)
*H01Q 3/46* (2006.01)

(52) U.S. Cl.
CPC ............ *H01Q 3/46* (2013.01); *H01Q 3/36* (2013.01)

(58) Field of Classification Search
CPC ............ H01Q 3/46; H01Q 3/36; H01Q 3/245; H01Q 19/062; H01Q 25/002; H04B 7/0456; H04B 7/0617
See application file for complete search history.

(56) References Cited

U.S. PATENT DOCUMENTS

| 8,193,994 B2 | 6/2012 | Alamouti et al. |
| 10,714,836 B1 | 7/2020 | Karabacak et al. |

(Continued)

FOREIGN PATENT DOCUMENTS

| CN | 101427422 A | 5/2009 |
| CN | 109075454 A | 12/2018 |

(Continued)

OTHER PUBLICATIONS

International Preliminary Report on Patentability—PCT/US2021/031846 the International Bureau of WIPO—Geneva, Switzerland, Dec. 1, 2022.

(Continued)

*Primary Examiner* — Awat M Salih
(74) *Attorney, Agent, or Firm* — Holland & Hart LLP

(57) ABSTRACT

Methods, systems, and devices for wireless communications are described. A device may be configured to include an array of lenses along with multiple antenna arrays that each include a set of antenna elements. The antenna arrays may each support multiple beam directions, such as a respective beam direction for each lens of the array of lenses. If beams for multiple antenna arrays concurrently pass through the same lens, the lens may contribute to maintaining separation between the beams. Lenses may also contribute to the shaping of beams, and the use of multiple lenses may enhance a coverage area for beams transmitted or received by the antenna arrays.

20 Claims, 9 Drawing Sheets

Related U.S. Application Data

(60) Provisional application No. 63/028,105, filed on May 21, 2020.

(56) References Cited

U.S. PATENT DOCUMENTS

| | | | |
|---|---|---|---|
| 2003/0081724 A1* | 5/2003 | Piestrup | G21K 1/06 378/84 |
| 2004/0227683 A1 | 11/2004 | Caimi et al. | |
| 2017/0271762 A1 | 9/2017 | Ko et al. | |
| 2020/0091608 A1 | 3/2020 | Alpman et al. | |
| 2020/0212588 A1 | 7/2020 | Rofougaran et al. | |
| 2020/0212590 A1 | 7/2020 | Rofougaran et al. | |
| 2021/0066798 A1* | 3/2021 | Kwak | H01Q 19/062 |
| 2021/0367340 A1 | 11/2021 | Horn et al. | |

FOREIGN PATENT DOCUMENTS

| | | |
|---|---|---|
| CN | 109995408 A | 7/2019 |
| WO | WO-2019139186 A1 | 7/2019 |

OTHER PUBLICATIONS

International Search Report and Written Opinion—PCT/US2021/031846—ISA/EPO—Aug. 23, 2021.

* cited by examiner

WIRELESS COMMUNICATIONS USING MULTIPLE ANTENNA ARRAYS AND A LENS ARRAY

CROSS REFERENCE

The present Application for Patent is a Divisional of U.S. patent application Ser. No. 17/315,941 by Horn et al., entitled "WIRELESS COMMUNICATIONS USING MULTIPLE ANTENNA ARRAYS AND A LENS ARRAY" and filed May 10, 2021, which claims the benefit of U.S. Provisional Patent Application No. 63/028,105 by Horn et al., entitled "WIRELESS COMMUNICATIONS USING MULTIPLE ANTENNA ARRAYS AND A LENS ARRAY" and filed May 21, 2020, each of which is assigned to the assignee hereof and is expressly incorporated by reference herein.

FIELD OF TECHNOLOGY

The following relates generally to wireless communications and more specifically to wireless communications using multiple antenna arrays and a lens array.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems, such as NR systems, may use high-frequency signals to form directional communication links to communicate data or other information. For example, an array of antenna elements may be configured to generate and steer beams in different directions by manipulating phase and/or amplitude relationships between signals transmitted or received by the individual antenna elements of the array, and each beam may correspond to a directional communication link. Such an array of antenna elements may in some cases be referred to as a phased antenna array. Communicating via multiple communication links may increase throughput, but increasing the number of concurrent beams supported by an array of antenna elements may increase component counts (e.g., more antenna elements, phase shifters, or other components) or introduce other complexities or drawbacks.

SUMMARY

The described techniques relate to improved methods, systems, devices, and apparatuses that support wireless communications using multiple antenna arrays and a lens array. A device thus may include multiple arrays of antenna elements and also multiple lenses. Each individual array of antenna elements may include a set of antenna elements along with associated phase shifting circuitry. The multiple lenses may be disposed as a lens array of any configuration, such as a one-dimensional (1D) lens array (e.g., a linear arrangement of lenses) or a two-dimensional (2D) lens array (e.g., multiple rows and multiple columns of lenses).

Each array of antenna elements may individually be capable of concurrently generating (either for transmitting or receiving signals) multiple beams in multiple different directions. For example, each array of antenna elements may be able to concurrently generate different beams pointed at different lenses of the lens array (e.g., a first beam pointed at a first lens, a second beam pointed at a second lens, and so on). If two arrays of antenna elements concurrently point beams at the same lens, the lens may maintain separation (e.g., orthogonality) between the beams (e.g., as perceived on the other side of the lens) due to the two arrays of antenna elements having different physical locations relative to the focal plane of the lens. Thus, for example, M arrays of antenna elements that can each individually support at least N concurrent beam directions, in conjunction with a lens array that includes at least N lenses, may support up to M*N concurrent beams, and thus M*N concurrent directional communication links.

An apparatus for wireless communication is described. The apparatus may include an array of lenses that includes a first lens and a second lens. The apparatus may further include a set of antenna array elements. A first antenna element array of the set may include a set of antenna elements and phase shifting circuitry. The phase shifting circuitry may be operable to steer a first beam between the first antenna element array and the first lens and to steer a second beam between the first antenna element array and the second lens.

In some examples of the apparatus described herein, a second antenna element array of the set may include a second set of antenna elements and second phase shifting circuitry. The second phase shifting circuitry may be operable to steer a third beam between the second antenna element array and the first lens and to steer a fourth beam between the second antenna element array and the second lens.

In some examples of the apparatus described herein, the phase shifting circuitry is operable to steer the first beam between the first antenna element array and the first lens concurrent with steering the second beam between the first antenna element array and the second lens.

In some examples of the apparatus described herein, each antenna element array of the set may operable to concurrently steer a respective beam in a respective direction corresponding to the first lens.

In some examples of the apparatus described herein, each antenna element array of the set may be operable to concurrently steer a respective set of beams, each beam of the respective set corresponding to a respective lens of the array of lenses.

Some examples of the apparatus described herein may further include control circuitry coupled with the set of antenna element arrays. The control circuitry may be configured to identify a first movement of a UE, where the first beam is associated with the UE, cause the first antenna element array, based on the first movement of the UE, to cease steering the first beam between the first antenna element array and the first lens, and cause a second antenna element array of the set, based on the first movement of the UE, to steer a third beam between the second antenna element array and the first lens, where the third beam is associated with the UE.

In some examples of the apparatus described herein, the control circuitry may be further configured to identify a second movement of the UE, cause the second antenna element array, based on the second movement of the UE, to cease steering the third beam between the second antenna element array and the second lens, and cause the first antenna element array, based on the second movement of the UE, to steer the second beam between the first antenna element array and the second lens, where the second beam is associated with the UE.

In some examples of the apparatus described herein, a distance between the first antenna element array and each lens of the array of lenses may be greater than a far field length for the first antenna element array.

In some examples of the apparatus described herein, each lens of the array of lenses may have a respective diameter, and a width of the first antenna element array may be smaller than the respective diameter of each lens of the array of lenses.

Some examples of the apparatus described herein may further include a third lens of the array of lenses, where the array of lenses may include a two-dimensional array of lenses, and where the first lens and the second lens may be aligned along a first dimension and the first lens and the third lens may be aligned along a second dimension.

Some examples of the apparatus described herein may further include switching circuitry operable to deactivate a subset of the set of antenna elements within the first antenna element array, and control circuitry coupled with the first antenna element array and configured to cause the switching circuitry to deactivate the subset of the set of antenna elements based on an operating mode for the apparatus.

In some examples of the apparatus described herein, the subset of the set of antenna elements may include a first antenna element and a second antenna element respectively disposed at a first edge and a second edge of the first antenna element array, or a first subset of antenna elements that is interleaved with a second subset of antenna elements within the first antenna element array.

In some examples of the apparatus described herein, the set of antenna element arrays may each be configured to be reciprocal with respect to transmission and reception of signals.

A method of wireless communication is described. The method may include steering a first beam between a first array of antenna elements and a first lens of an array of lenses, where the first array of antenna elements is one of a set of arrays of antenna elements and steering a second beam between the first array of antenna elements and a second lens of the array of lenses.

An apparatus for wireless communication is described. The apparatus may include a processor, memory coupled with the processor, and instructions stored in the memory. The instructions may be executable by the processor to cause the apparatus to steer a first beam between a first array of antenna elements and a first lens of an array of lenses, where the first array of antenna elements is one of a set of arrays of antenna elements and steer a second beam between the first array of antenna elements and a second lens of the array of lenses.

Another apparatus for wireless communication is described. The apparatus may include means for steering a first beam between a first array of antenna elements and a first lens of an array of lenses, where the first array of antenna elements is one of a set of arrays of antenna elements and steering a second beam between the first array of antenna elements and a second lens of the array of lenses.

A non-transitory computer-readable medium storing code for wireless communication is described. The code may include instructions executable by a processor to steer a first beam between a first array of antenna elements and a first lens of an array of lenses, where the first array of antenna elements is one of a set of arrays of antenna elements and steer a second beam between the first array of antenna elements and a second lens of the array of lenses.

Some examples of the method, apparatuses, and non-transitory computer-readable medium described herein may further include operations, features, means, or instructions for steering a third beam between a second array of antenna elements and the first lens, where the second array of antenna elements may be another of the set of arrays of antenna elements.

In some examples of the method, apparatuses, and non-transitory computer-readable medium described herein, the first beam may be steered between the first array of antenna elements and the first lens concurrent with the third beam being steered between the second array of antenna elements and the first lens.

Some examples of the method, apparatuses, and non-transitory computer-readable medium described herein may further include operations, features, means, or instructions for communicating with a first UE via the first beam, and communicating with the first UE via the second beam.

Some examples of the method, apparatuses, and non-transitory computer-readable medium described herein may further include operations, features, means, or instructions for communicating with a UE via the first beam, identifying a movement of the UE, and communicating with the UE, based on the movement of the UE, via the third beam after communicating with the UE via the first beam.

Some examples of the method, apparatuses, and non-transitory computer-readable medium described herein may further include operations, features, means, or instructions for identifying a second movement of the UE, and communicating with the UE, based on the second movement of the UE, via the second beam after communicating with the UE via the third beam.

In some examples of the method, apparatuses, and non-transitory computer-readable medium described herein, the first beam may be steered between the first array of antenna elements and the first lens concurrent with the second beam being steered between the first array of antenna elements and the second lens.

Some examples of the method, apparatuses, and non-transitory computer-readable medium described herein may further include operations, features, means, or instructions for communicating with a first UE via the first beam, and communicating with a second UE via the second beam.

Some examples of the method, apparatuses, and non-transitory computer-readable medium described herein may further include operations, features, means, or instructions for communicating, during a first time period, via the first beam using a first quantity of antenna elements within the first array of antenna elements, and communicating, during a second time period, via a fourth beam using a second quantity of antenna elements within the first array of antenna elements.

Some examples of the method, apparatuses, and non-transitory computer-readable medium described herein may further include operations, features, means, or instructions for identifying, between the first time period and the second time period, a change in target transmit power associated with the first array of antenna elements, where changing from using the first quantity of antenna elements to using the second quantity of antenna elements may be based on the change in target transmit power.

Some examples of the method, apparatuses, and non-transitory computer-readable medium described herein may further include operations, features, means, or instructions for changing from using the first quantity of antenna elements to using the second quantity of antenna elements based on deactivating a first antenna element and a second antenna element respectively disposed at a first edge and a second edge of the first array of antenna elements, or changing from using the first quantity of antenna elements to using the second quantity of antenna elements based on deactivating a first subset of antenna elements that may be interleaved with a second subset of antenna elements within the first array of antenna elements, where the second quantity includes the second subset of antenna elements.

In some examples of the method, apparatuses, and non-transitory computer-readable medium described herein, a distance between the first array of antenna elements and each lens of the array of lenses may be greater than a far field length for the first array of antenna elements.

In some examples of the method, apparatuses, and non-transitory computer-readable medium described herein, each lens of the array of lenses may have a respective diameter, and a width of the first array of antenna elements may be smaller than the respective diameter of each lens of the array of lenses.

In some examples of the method, apparatuses, and non-transitory computer-readable medium described herein, the array of lenses includes a two-dimensional array of lenses, the first lens and the second lens may be aligned along a first dimension, and the first lens and a third lens of the array of lenses may be aligned along a second dimension.

DETAILED DESCRIPTION

Figure 1:
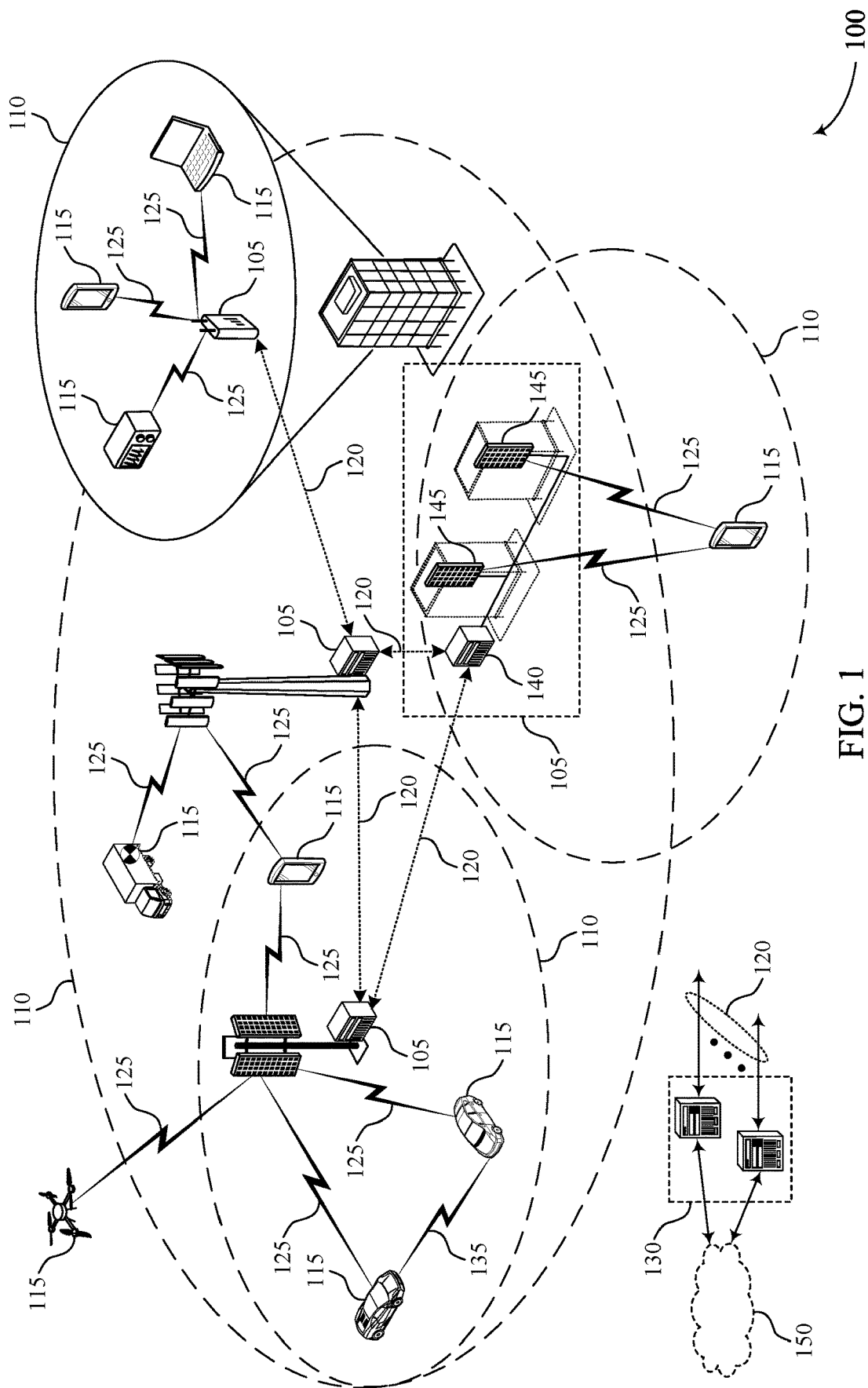
FIG. 1 illustrates an example of a system for wireless communications that supports wireless communications using multiple antenna arrays and a lens array in accordance with aspects of the present disclosure.

Wirelessly communicating between two devices via multiple directional communication links (e.g., beams) may provide, for example, throughput benefits (e.g., an increased peak data rate) or reliability benefits (e.g., due to spatial diversity between beams and thus between links). In some cases, an array of antenna elements may be used to form beams, but many antenna elements may be used within a single array in order to form multiple tight beams, and beams from multiple arrays in similar directions may interfere with each other.

Structures and techniques as described herein may provide for various many-to-many solutions in which multiple arrays of antenna elements are operated in conjunction with multiple lenses (e.g., a lens array) at single transmitting or receiving device within a wireless communications system. A single array of antenna elements may alternatively be referred to herein as an antenna element array or as an antenna array for brevity. An antenna array may be a phased antenna array, for example. In some cases, each of M antenna arrays at a device may individually support at least N concurrent (e.g., at least partially overlapping in time) beams in different directions, and there may be at least N lenses in the lens array at the device. For each of the M antenna arrays, each of N beam directions may correspond to (e.g., point towards) a different lens of the lens array. Thus, each antenna array may individually be capable of concurrently pointing different beams at different lenses of the lens array (e.g., for each of the M antenna arrays, at least one respective beam may be pointed at each lens of the lens array, such that up to at least M beams may be concurrently pointed at any one lens of the lens array). If two antenna arrays both point respective beams at the same lens at the same time, the lens may maintain separation (e.g., orthogonality) between the beams, for example because the two antenna arrays may have different physical locations relative to the focal plane of the lens. At least M*N directional communication links thus may be simultaneously supported by a wireless device as described herein.

Beneficially, the use of multiple antenna arrays may support multiple beams and thus multiple links in the direction of a single lens, which may provide throughput or other benefits. As another example, the use of an array of lenses (e.g., as opposed to a single lens) may improve coverage radius with respect to the set of supported beams (e.g., enhanced spherical coverage may be obtained). Additionally or alternatively, a quantity of antenna elements per antenna array may be reduced while maintaining beam shape (e.g., tightness) and link separation (or the quantity of antenna elements per antenna array may be maintained while improving beam shape), as the lenses may contribute to beam-shaping and beam separation. For example, an antenna array may generate a relatively wide beam, which may be focused (e.g., tightened) by a lens such that a relatively narrow beam is generated on the other side of the lens from the antenna array. Further, the use of antenna arrays may provide improved transmission power per beam (e.g., relative to using a lens to focus an otherwise omnidirectional transmission). One of ordinary skill in the art may appreciate further or alternative benefits associated with the teachings herein.

Aspects of the disclosure are initially described in the context of wireless communications systems. Aspects of the disclosure are further illustrated by and described with reference to diagrams and flowcharts that relate to wireless communications using multiple antenna arrays and a lens array.

FIG. 1 illustrates an example of a wireless communications system 100 that supports wireless communications using multiple antenna arrays and a lens array in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The communications links 125 may in some cases include one or more directionally communications links as described herein. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas (e.g., multiple antenna arrays), which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer (e.g., point or otherwise orient) an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation). As described herein, beamforming may in some cases be further achieved through the use of a lens array, where lenses of the array may shape (e.g., tighten, focus) beams to or from antenna arrays and may maintain separation (e.g., orthogonality) between beams to or from different antenna arrays.

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A wireless device (e.g., a base station 105, relay device, UE 115, or other device configured to transmit or receive wireless signals) may include an array of lenses and multiple antenna arrays (e.g., each including multiple antenna elements). Each of the multiple antenna arrays may individually support (e.g., be capable of generating and steering) multiple beams in different directions. For example, each antenna array may be capable of steering (e.g., concurrently) at least one beam at each lens of the lens array. Thus, a lens may in some cases be traversed by (e.g., have directed upon it, be passed through by) multiple concurrent beams, where at least some of the multiple concurrent beams are associated with different antenna arrays of the multiple antenna arrays. A lens may tighten or otherwise refine a beam that traverses the lens. Additionally or alternatively, a lens may maintain separation (e.g., orthogonality) between different beams that concurrently traverse the lens. In some cases, the wireless device may steer multiple beams concurrently where the multiple beams may be to or from the same antenna array or from different antenna arrays. The multiple beams may be associated with (e.g., directed to or from, to exchange signaling with) one other wireless device or multiple wireless devices.

Figure 2:
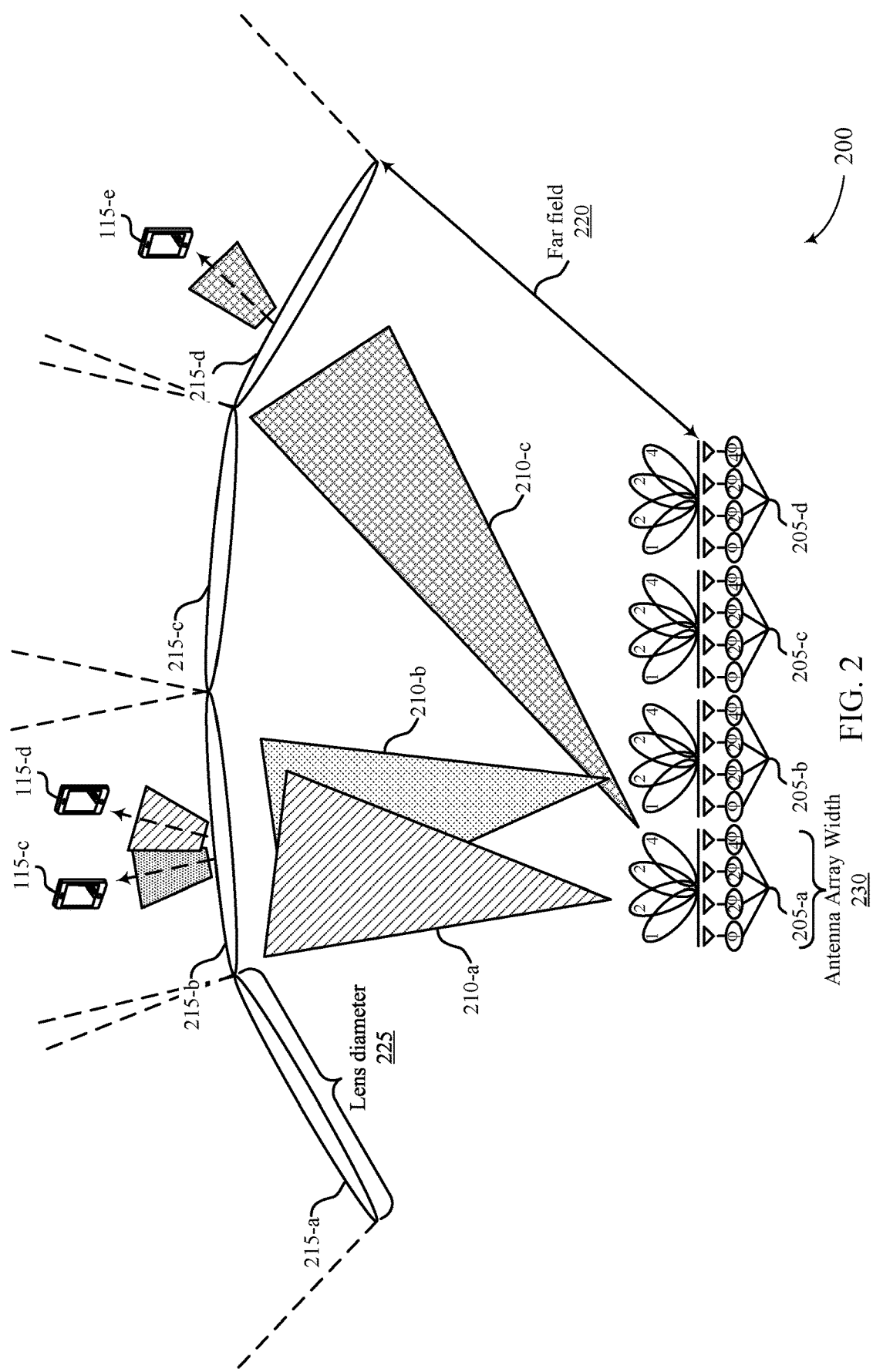
FIG. 2 illustrates an example configuration of multiple antenna arrays and a lens array in accordance with aspects of the present disclosure.

FIG. 2 illustrates an example configuration 200 of multiple antenna arrays and a lens array in accordance with aspects of the present disclosure. The configuration 200 may include multiple antenna arrays 205 and a lens array that includes multiple lenses 215. Though four antenna arrays 205 and four lenses 215 are shown in the example of FIG. 2, it is to be understood that any quantity of antenna arrays and any quantity of lenses are possible.

An antenna array 205 may include multiple antenna elements along with associated circuitry (e.g., radio frequency circuitry) for generating or otherwise steering beams 210 in a number of different directions (e.g., concurrently). For example, an antenna array 205 may include phase shifters, and each phase shifter may be configured to adjust the phase or one or more other attributes of signals transmitted or received via a corresponding antenna element of the antenna array 205. In some cases, the phase shifters of an antenna array may be arranged as groups referred to as layers, and each beam for an antenna array 205 may correspond to (e.g., be generated or otherwise steered by) a different phase shifter layer, such that a number of phase shifter layers at an antenna array 205 may correspond to a number of concurrent beam directions supported by the antenna array 205. Though the example of FIG. 2 illustrates each antenna array 205 as supporting four beam directions, it is to be understood that an antenna array 205 may support any quantity of beam directions depending on implementation.

An antenna array 205 may be able to steer one or more beams 210 towards any lens 215 within the lens array, or alternatively to any lens 215 within a subset of the lenses 215 of the lens array. As one example, antenna array 205-a may be able to steer beam 210-a towards lens 215-b and to steer (e.g., concurrently) beam 210-c towards lens 215-d. Though not all possible beams 210 supported by the example configuration 200 are shown for reasons related to clarity of illustration, antenna array 205-a may also be able to steer (e.g., concurrently) another beam 210 towards lens 215-a and another beam 210 towards lens 215-c (e.g., each antenna array 205 may be able to concurrently steer at least one beam at each lens 215). Any quantity of other antenna arrays 205 may also be able to steer a beam 210 towards a lens 215 of the lens array, potentially concurrent with antenna array 205-a steering a beam 210 towards the lens 215. For example, as illustrated in FIG. 2, antenna array 205-b may steer beam 210-b towards lens 215-b concurrent with antenna array 205-a steering beam 210-a towards lens 215-b.

Lenses 215 of a lens array may be arranged in any configuration. For example, the lens array may be a 1D lens array, and lenses 215 of the lens array may be disposed (e.g., arranged) in a row, column, or other linear configuration. As another example, the lens array may be a 2D lens array, and lenses 215 of the lens array may be arranged as a set of rows and columns, a rectangular array, or otherwise may span at least two dimensions (e.g., horizontal and vertical dimensions). In some cases, a device may include more than one lens array 215. The use of multiple lenses may provide for an enhanced radius or area of coverage by the configuration 200 (e.g., enhanced spherical coverage). Where a 2D lens array is used, antenna arrays 205 may be configured to support 2D beamforming. For example, antenna arrays 205 may include 2D phase shifters, and the antenna elements of an antenna array 205 may be configured as a unified rectangular array (URA) or other 2D array.

In some cases, a lens 215 may contribute to beamforming (e.g., beam-shaping). For example, a lens 215 may refine (e.g., tighten, collimate, or otherwise focus or improve) a beam 210 that passes through (e.g., traverses) the lens 215. As another example, a lens 215 may contribute to maintaining separation (e.g., orthogonality) between different beams 210 that concurrently pass through the lens 215. For instance, a lens 215 may alter a plane wave angle (e.g., direction) associated with a beam that passes through the lens 215. For example, when an antenna array 205 transmits or receives a beam 210 that passes through a lens 215, the lens may alter the plane wave angle of the beam based on a physical location of the antenna array 205 relative to a focal plane. Thus, if two antenna arrays 205 both transmit or receive beams 210 that pass through the same lens 215, the lens 215 may cause the beams 210 to have different plane wave angles as received by the two antenna arrays 205 or as received by one or more other target devices, even if, for example, associated phase shifters at the two different antenna arrays 205 are configured identically.

In the example of FIG. 2, the example configuration 200 may be included at a base station 105, and the base station 105 may communicate with other wireless devices, such as UEs 115. For example, the base station 105 may communicate with UE 115-d via a first directional communications link corresponding to beam 210-a (which may be transmitted or received by antenna array 205-a and pass through lens 215-b) and may communicate (e.g., concurrently) with UE 115-c via a second directional communications link corresponding to beam 210-b (which may be transmitted or received by antenna array 205-b and also pass through lens 215-b). Additionally or alternatively, the base station 105 may communicate (e.g., concurrently) with UE 115-e via a third directional communications link corresponding to beam 210-c (which may be transmitted or received by antenna array 205-a and pass through lens 215-d). In some cases, the base station 105 may communicate with a single UE 115 via multiple beams 210 (e.g., via multiple beams 210 transmitted or received by different antenna arrays 205), potentially to implement a MIMO configuration.

In some cases, any antenna array 205 and lens 215 combination may be supported (e.g., concurrently). For example, a wireless device may include M antenna arrays 205 and N lenses 215. Each antenna array 205 may support up to at least N concurrent beams 210, with one beam 210 directed toward each of the N lenses 215. Thus, up to at least M beams may concurrently pass through each lens 215, with each of the M beams 210 passing through a given lens 215 corresponding to a different antenna array 205. In some cases, a total of M*N concurrent beams (and thus M*N concurrent directional communication links) may be supported by a wireless device as described herein.

In some cases, a wireless device as described herein may support beam tracking while communicating with another wireless device, as the physical location of the other wireless device may change relative to the wireless device as described herein. When the relative physical location of the other wireless device changes but remains within an aperture of same lens 215, the wireless device as described herein may switch from communicating with the other wireless device using one antenna array 205 to communicating with the other wireless device using a different antenna array 205. For example, at a first time, a UE 115 may be located where the example of FIG. 2 illustrates UE 115-d, and a base station 105 may communicate with the UE 115 using antenna array 205-a and beam 210-a through lens 215-b. The UE 115 may move, however, such that at a second time the UE 115 may be physically located where UE 115-c is located in the example illustration of FIG. 2. The base station 105 may, at the second time, communicate with the UE 115 using antenna array 205-b and beam 210-b through lens 215-b. Thus, where relative movement of the UE 115 occurs but the UE 115 remains within the aperture of the same lens 215, the base station 105 may switch antenna arrays 205 but not the lens 215 used to communicate with the UE 115.

When the relative physical location of the other wireless device changes such that the other wireless device enters the aperture of a second lens 215 (and possibly also leaves the aperture of a first lens 215), the wireless device as described herein may maintain communications with the other wireless device based on changing the beam direction (e.g., phase shifter configuration) associated with an antenna array 205. For example, and continuing the example of the preceding paragraph, the UE 115 may at a third time come to be physically located where UE 115-e is located in the example illustration of FIG. 2. The base station 105 may, at the third time, communicate with the UE 115 using antenna array 205-a and beam 210-c through lens 215-d. Thus, where relative movement of the UE 115 causes the UE 115 to leave the aperture of one lens 215 or otherwise enter the aperture of another lens 215, the base station may rely on different beam directions supported by a same antenna array 205 but directed toward different lenses 215 to may maintain communications with the UE 115.

In general, beam tracking may be performed based on any combination of switching between antenna arrays 205 or switching between lenses 215 (e.g., based on different beam directions associated with the same or different antenna arrays 205) to maintain communications with another wireless device that is within the aperture of at least one lens of the lens array 215. In some cases, control circuitry of the may be coupled with the antenna arrays 205 to manage or otherwise implement beam tracking operations.

In some cases, a distance from an antenna array 205 to a lens 215 (e.g., the distance between the antenna array 205 and the lens 215 nearest that antenna array) may be equal to or greater than a far field length 220 of the antenna array 205. In some cases, a distance between antenna arrays 205 of a wireless device may be configured (e.g., calibrated) to optimize or otherwise configure an extent of beam separation for beams 210 associated with different (e.g., adjacent) antenna arrays 205. Accordingly, a distance between antenna arrays 205 of a wireless device may in some cases depend on a diameter of one or more lenses 215 of the lens array at the wireless device.

And in some cases, the aperture of a lens 215 may be optimized or otherwise configured to maximize or otherwise enhance an amount of energy captured by the lens 215 for each beam 210 supported by one or more of the antenna arrays 205. For example, the aperture of a lens 215 may be configured to capture a maximum or substantially maximum aperture of each main lobe associated with each beam 210. In some cases, the lens diameter 225 of a lens 215 may be greater than or equal to the width 230 of antenna array, where the width 230 of an antenna array 205 may correspond to the distance between an outer edge of an antenna element of the antenna array 205 and a farthest outer edge of a farthest other antenna element of the antenna array 205. Additionally or alternative, the number of lenses 215 may in some cases be equal to or less than the number of beam directions (e.g., concurrent beam directions) supported by an individual antenna array 205. In some cases, the number of beam directions supported by an individual antenna array 205 may depend on a granularity associated with the phase shifters within an individual antenna array 205 (e.g., a number bits used to control or otherwise configure the phase shift implemented by an individual phase shifter).

In some cases, a wireless device may be able to activate or deactivate (e.g., switch on or off) different antenna elements within an antenna array 205, and thus transmit or receive signals using variable quantities of antenna elements, to support different levels of power consumption. For example, to support reduced power consumption, the wireless device may deactivate one or more antenna elements at one or more edges of an antenna array 205 or may deactivate every other or some other interleaved subset of antenna elements within an antenna array 205. An antenna element that is operable to be deactivated may, for example, be coupled with a switch, where the switch is operable to case the antenna element to be activated or deactivated.

Antenna arrays 205, lenses 215, and other aspects of a wireless device as described herein may be configured to be reciprocal (e.g., maintain above a threshold level of reciprocity with respective to transmitting and receiving signals (e.g., with respect to downlink and uplink communications). For example, the antenna arrays 205 may each be configured to be reciprocal with respect to transmission and reception of signals. As one such example, transmissions by an antenna array 205 may use amplitude profiles or other parameters acquired from or otherwise based on one or more signals received by the antenna array 205.

Though some examples may be described herein from the perspective of a base station that includes multiple antenna arrays 205 and multiple lenses 215, it is to be understood that any device that transmits or receives wireless signals (e.g., relay devices, UEs 115 such as vehicular or other types of UEs 115) may be configured to include and utilize multiple antenna arrays 205 and multiple lenses 215 in accordance with the teachings herein.

Figure 3:
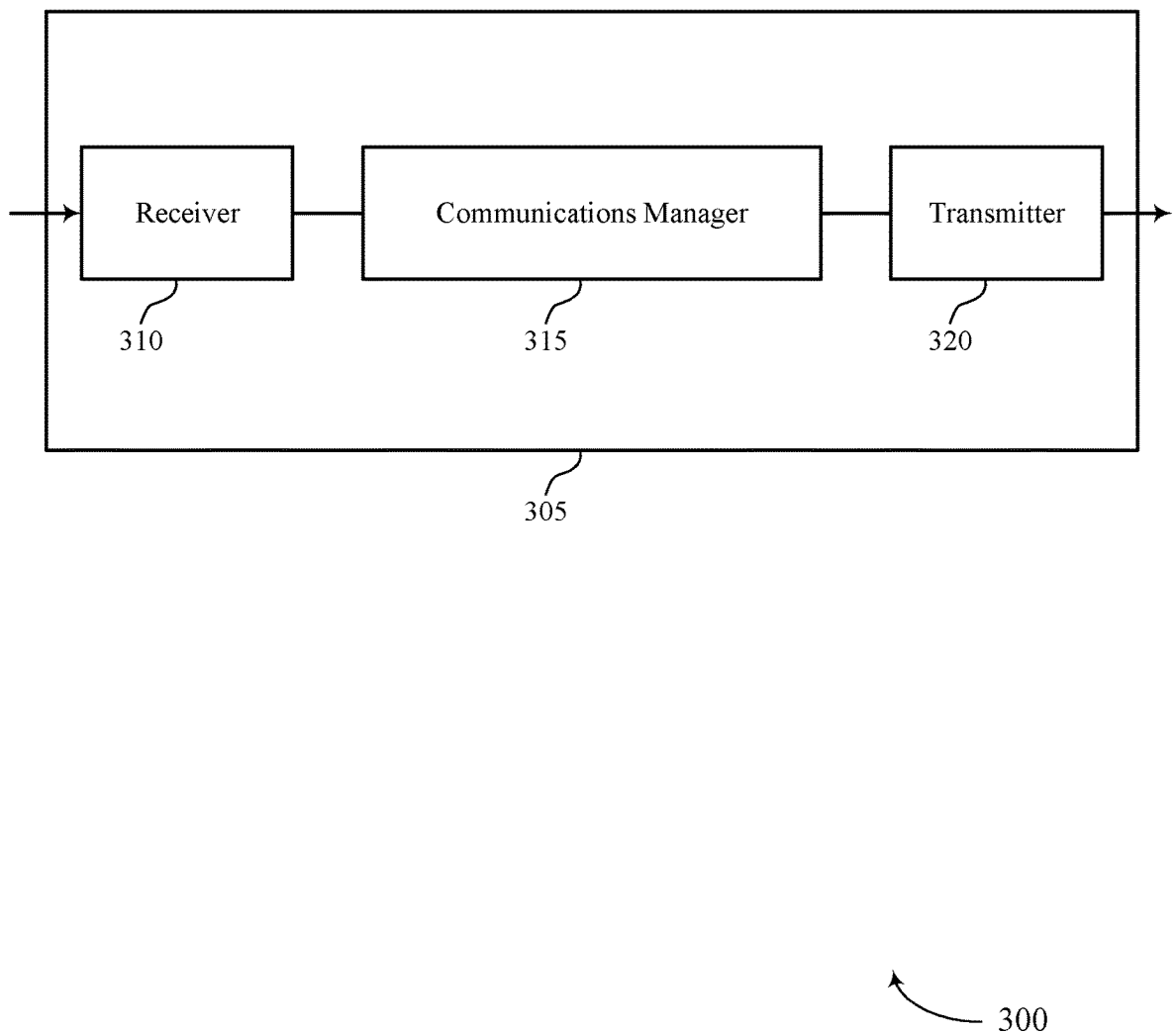
FIGS. 3 and 4 show diagrams of devices that support wireless communications using multiple antenna arrays and a lens array in accordance with aspects of the present disclosure.

FIG. 3 shows a diagram 300 of a device 305 that supports wireless communications using multiple antenna arrays and a lens array in accordance with aspects of the present disclosure. The device 305 may be an example of aspects of a base station 105 as described herein. The device 305 may include a receiver 310, a communications manager 315, and a transmitter 320. The device 305 may also include a processor. Each of these components may be in communication with one another (e.g., via one or more buses).

The receiver 310 may receive information such as packets, user data, or control information associated with various information channels (e.g., control channels, data channels, and information related to wireless communications using multiple antenna arrays and a lens array). Information may be passed on to other components of the device 305. The receiver 310 may be an example of aspects of the transceiver 620 described with reference to FIG. 6. The receiver 310 may utilize a single antenna or a set of antennas. For example, the receiver 310 may be coupled with or include a set of antenna arrays 205 as described herein.

The transmitter 320 may transmit signals generated by other components of the device 305. In some examples, the transmitter 320 may be collocated with a receiver 310 in a transceiver module. For example, the transmitter 320 may be an example of aspects of the transceiver 620 described with reference to FIG. 6. The transmitter 320 may utilize a single antenna or a set of antennas. For example, the transmitter 320 may be coupled with or include a set of antenna arrays 205 as described herein.

The communications manager 315 may steer a first beam between a first array of antenna elements and a first lens of an array of lenses, where the first array of antenna elements is one of a set of arrays of antenna elements and steer a second beam between the first array of antenna elements and a second lens of the array of lenses. The communications manager 315 may be an example of aspects of the communications manager 610 described herein.

The communications manager 315, or its sub-components, may be implemented in hardware, code (e.g., software or firmware) executed by a processor, or any combination thereof. If implemented in code executed by a processor, the functions of the communications manager 315, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 315, or its sub-components, may be physically located at various positions, including being distributed such that portions of functions are implemented at different physical locations by one or more physical components. In some examples, the communications manager 315, or its sub-components, may be a separate and distinct component in accordance with various aspects of the present disclosure. In some examples, the communications manager 315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 315 as described herein may be implemented to realize one or more potential advantages. One implementation may allow the device 405 to more efficiently perform beam forming and beam steering operations. For example, a device 405 may be configured with an array of lenses and one or more antenna arrays to perform communications with one or more other devices, where the array of lenses may collimate a wide beam transmitted from a low number of antenna elements into a narrow beam.

Based on implementing the lens array and antenna array configuration as described herein, a processor of a device (e.g., controlling the receiver 310, the transmitter 320, or the transceiver 620 as described with reference to FIG. 6) may increase spherical coverage, decrease increase array gain, and enhance throughput in the implementation of a lens array and antenna array beamforming and beam steering apparatus.

Figure 4:
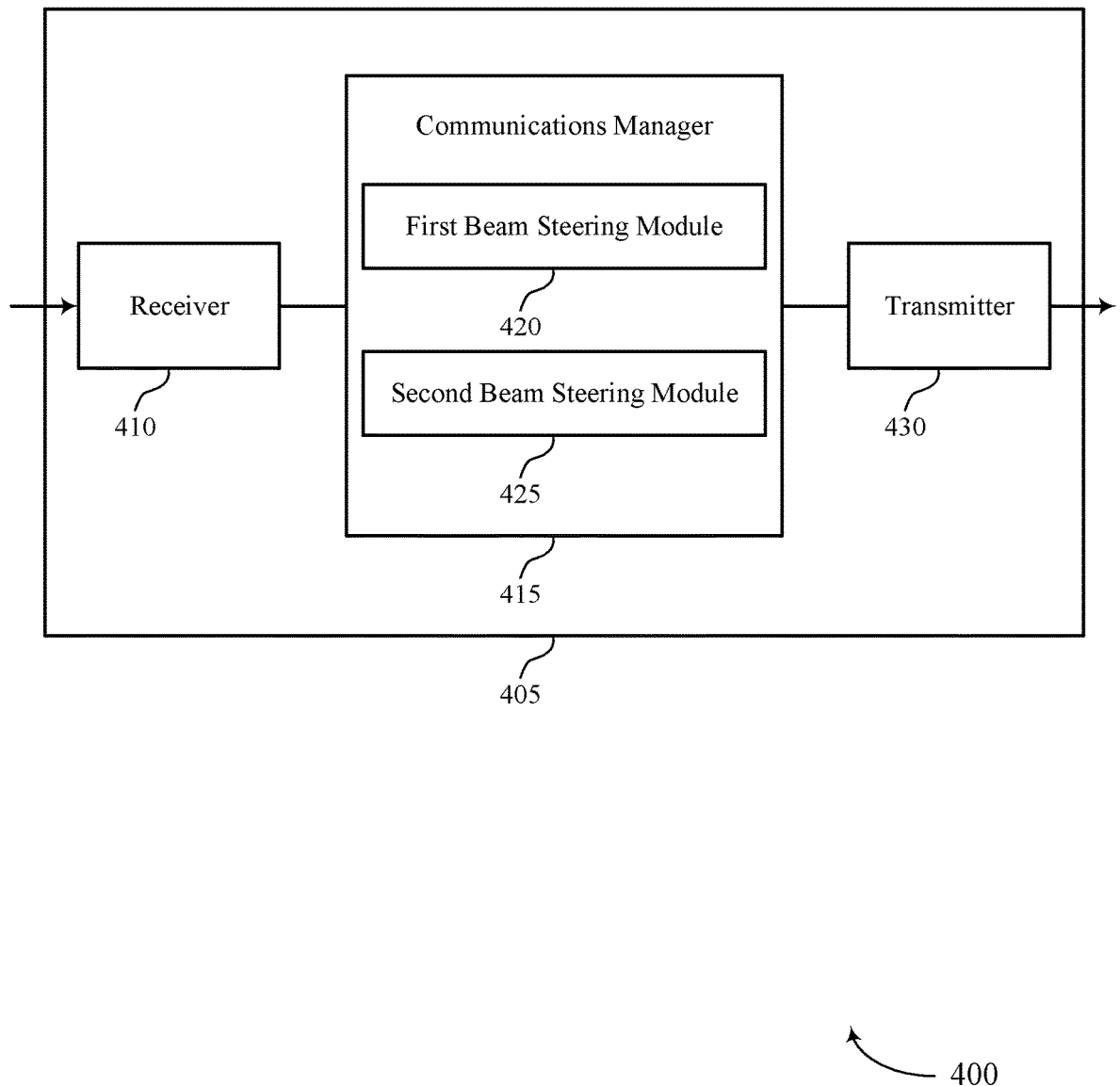

FIG. 4 shows a diagram 400 of a device 405 that supports wireless communications using multiple antenna arrays and a lens array in accordance with aspects of the present disclosure. The device 405 may be an example of aspects of a device 305, or a base station 105 as described herein. The device 405 may include a receiver 410, a communications manager 415, and a transmitter 430. The device 405 may also include a processor. Each of these components may be in communication with one another (e.g., via one or more buses).

The receiver 410 may receive information such as packets, user data, or control information associated with various information channels (e.g., control channels, data channels, and information related to wireless communications using multiple antenna arrays and a lens array). Information may be passed on to other components of the device 405. The receiver 410 may be an example of aspects of the transceiver 620 described with reference to FIG. 6. The receiver 410 may utilize a single antenna or a set of antennas. For example, the receiver 410 may be coupled with or include a set of antenna arrays 205 as described herein.

The transmitter 430 may transmit signals generated by other components of the device 405. In some examples, the transmitter 430 may be collocated with a receiver 410 in a transceiver module. For example, the transmitter 430 may be an example of aspects of the transceiver 620 described with reference to FIG. 6. The transmitter 430 may utilize a single antenna or a set of antennas. For example, the transmitter 430 may be coupled with or include a set of antenna arrays 205 as described herein.

The communications manager 415 may be an example of aspects of the communications manager 315 as described herein. The communications manager 415 may include a first beam steering module 420 and a second beam steering module 425. The communications manager 415 may be an example of aspects of the communications manager 610 described herein.

The first beam steering module 420 may steer a first beam between a first array of antenna elements and a first lens of an array of lenses, where the first array of antenna elements is one of a set of arrays of antenna elements. The second beam steering module 425 may steer a second beam between the first array of antenna elements and a second lens of the array of lenses.

Figure 5:
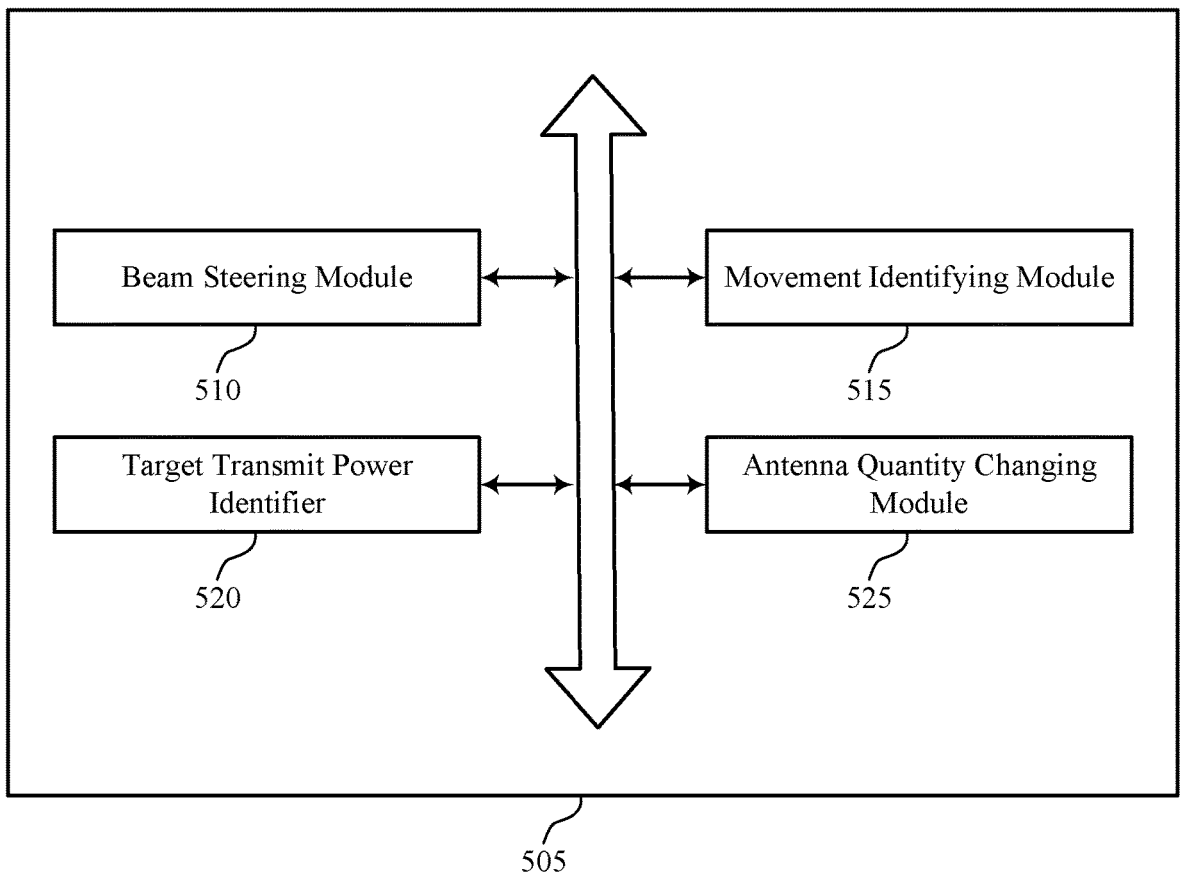
FIG. 5 shows a diagram of a communications manager that supports wireless communications using multiple antenna arrays and a lens array in accordance with aspects of the present disclosure.

FIG. 5 shows a diagram 500 of a communications manager 505 that supports wireless communications using multiple antenna arrays and a lens array in accordance with aspects of the present disclosure. The communications manager 505 may be an example of aspects of a communications manager 315, a communications manager 415, or a communications manager 610 described herein. The communications manager 505 may include a beam steering module 510, a movement identifying module 515, a target transmit power identifier 520, and an antenna quantity changing module 525. Each of these modules may communicate, directly or indirectly, with one another (e.g., via one or more buses).

The beam steering module 510 may steer a first beam between a first array of antenna elements and a first lens of an array of lenses, where the first array of antenna elements is one of a set of arrays of antenna elements. The beam steering module 510 may steer a second beam between the first array of antenna elements and a second lens of the array of lenses. The beam steering module 510 may steer a third beam between a second array of antenna elements and the first lens, where the second array of antenna elements is another of the set of arrays of antenna elements.

In some cases, the first beam is steered between the first array of antenna elements and the first lens concurrent with the third beam being steered between the second array of antenna elements and the first lens. In some examples, the beam steering module 510 may communicate with a first UE via the first beam. In some examples, the beam steering module 510 may communicate with the first UE via the second beam.

In some examples, the beam steering module 510 may cause a wireless device to communicate with a UE via the first beam. The movement identifying module 515 may identify a movement of the UE. In some examples, the beam steering module 510 may cause the wireless device to communicate with the UE, based on the movement of the UE, via the third beam after communicating with the UE via the first beam.

In some examples, the movement identifying module 515 may identify a second movement of the UE. In some examples, the beam steering module 510 may cause the wireless device to communicate with the UE, based on the second movement of the UE, via the second beam after communicating with the UE via the third beam.

In some cases, the first beam is steered between the first array of antenna elements and the first lens concurrent with the second beam being steered between the first array of antenna elements and the second lens. In some examples, the beam steering module 510 may cause the wireless device to communicate with a first UE via the first beam. In some examples, the beam steering module 510 may cause the wireless device to communicate with a second UE via the second beam.

In some examples, the beam steering module 510 may cause the wireless device to communicate, during a first time period, via the first beam using a first quantity of antenna elements within the first array of antenna elements. The beam steering module 510 may cause the wireless device to communicate, during a second time period, via a fourth beam using a second quantity of antenna elements within the first array of antenna elements.

The target transmit power identifier 520 may identify, between the first time period and the second time period, a change in target transmit power associated with the first array of antenna elements, where changing from using the first quantity of antenna elements to using the second quantity of antenna elements is based on the change in target transmit power.

The antenna quantity changing module 525 may change from using the first quantity of antenna elements to using the second quantity of antenna elements based on deactivating a first antenna element and a second antenna element respectively disposed at a first edge and a second edge of the first antenna element array. The antenna quantity changing module 525 may change from using the first quantity of antenna elements to using the second quantity of antenna elements based on deactivating a first subset of antenna elements that is interleaved with a second subset of antenna elements within the first antenna element array, where the second quantity includes the second subset of antenna elements.

In some cases, a distance between the first array of antenna elements and each lens of the array of lenses is greater than a far field length for the first array of antenna elements. In some cases, each lens of the array of lenses has a respective diameter. In some cases, a width of the first array of antenna elements is smaller than the respective diameter of each lens of the array of lenses. In some cases, the array of lenses includes a two-dimensional array of lenses. In some cases, the first lens and the second lens are aligned along a first dimension. In some cases, the first lens and a third lens of the array of lenses are aligned along a second dimension.

Figure 6:
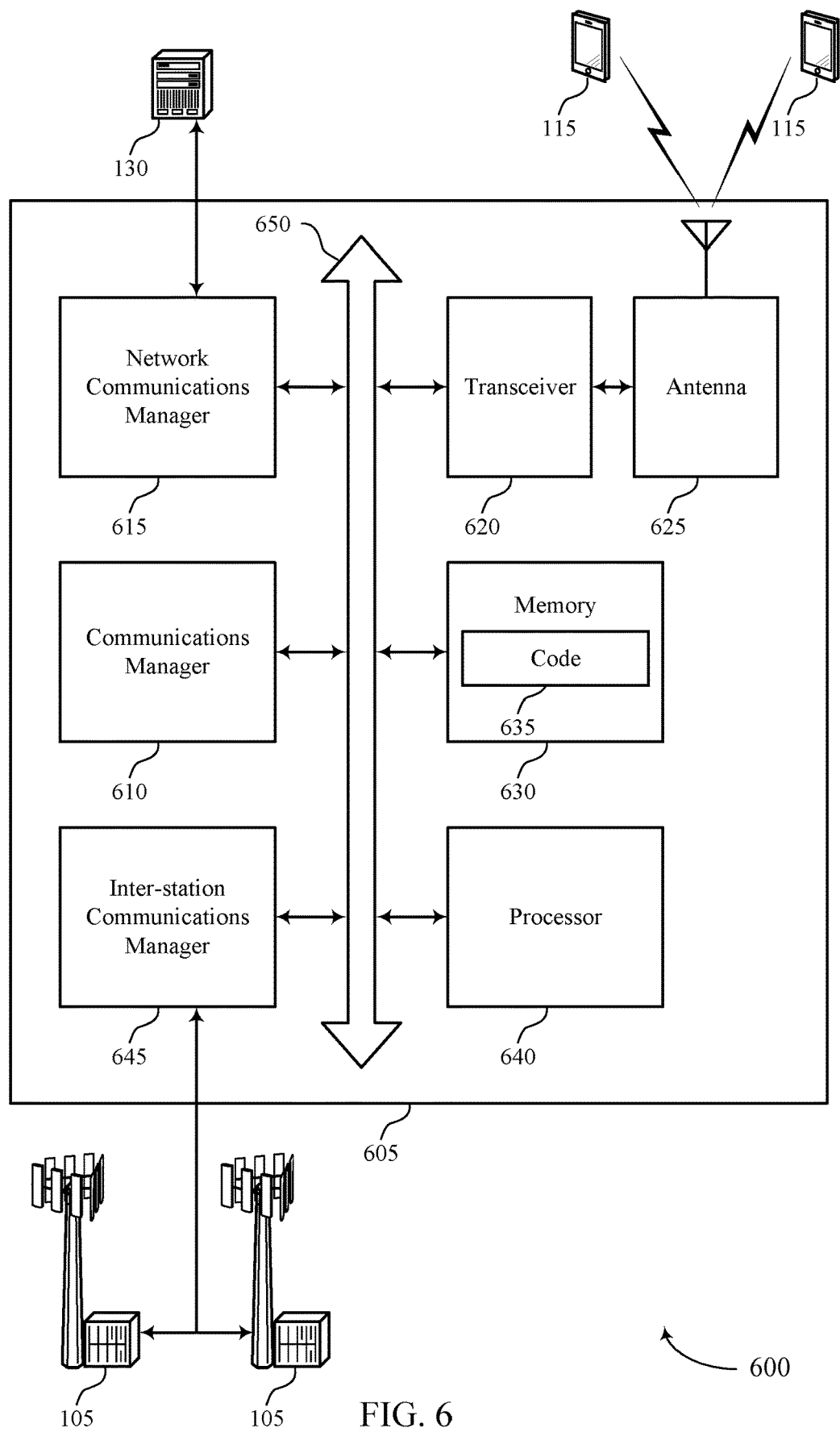
FIG. 6 shows a diagram of a system including a device that supports wireless communications using multiple antenna arrays and a lens array in accordance with aspects of the present disclosure.

FIG. 6 shows a diagram of a system 600 including a device 605 that supports wireless communications using multiple antenna arrays and a lens array in accordance with aspects of the present disclosure. The device 605 may be an example of or include the components of device 305, device 405, or a base station 105 as described herein. The device 605 may include components for bi-directional voice and data communications including components for transmitting and receiving communications, including a communications manager 610, a network communications manager 615, a transceiver 620, an antenna 625, memory 630, a processor 640, and an inter-station communications manager 645. These components may be in electronic communication via one or more buses (e.g., bus 650).

The communications manager 610 may steer a first beam between a first array of antenna elements and a first lens of an array of lenses, where the first array of antenna elements is one of a set of arrays of antenna elements and steer a second beam between the first array of antenna elements and a second lens of the array of lenses.

The network communications manager 615 may manage communications with the core network (e.g., via one or more wired backhaul links). For example, the network communications manager 615 may manage the transfer of data communications for client devices, such as one or more UEs 115.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

The antenna 625 may include a set of antenna arrays, which may be configured in conjunction with a set of lenses as described herein.

The memory 630 may include random-access memory (RAM), read-only memory (ROM), or a combination thereof. The memory 630 may store computer-readable code 635 including instructions that, when executed by a processor (e.g., the processor 640) cause the device to perform various functions described herein. In some cases, the memory 630 may contain, among other things, a basic I/O system (BIOS) which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In some cases, a memory controller may be integrated into processor 640. The processor 640 may be configured to execute computer-readable instructions stored in a memory (e.g., the memory 630) to cause the device 605 to perform various functions (e.g., functions or tasks supporting wireless communications using multiple antenna arrays and a lens array).

The inter-station communications manager 645 may manage communications with other base station 105, and may include a controller or scheduler for controlling communications with UEs 115 in cooperation with other base stations 105. For example, the inter-station communications manager 645 may coordinate scheduling for transmissions to UEs 115 for various interference mitigation techniques such as beamforming or joint transmission. In some examples, the inter-station communications manager 645 may provide an X2 interface within an LTE/LTE-A wireless communication network technology to provide communication between base stations 105.

The code 635 may include instructions to implement aspects of the present disclosure, including instructions to support wireless communications. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Figure 7:
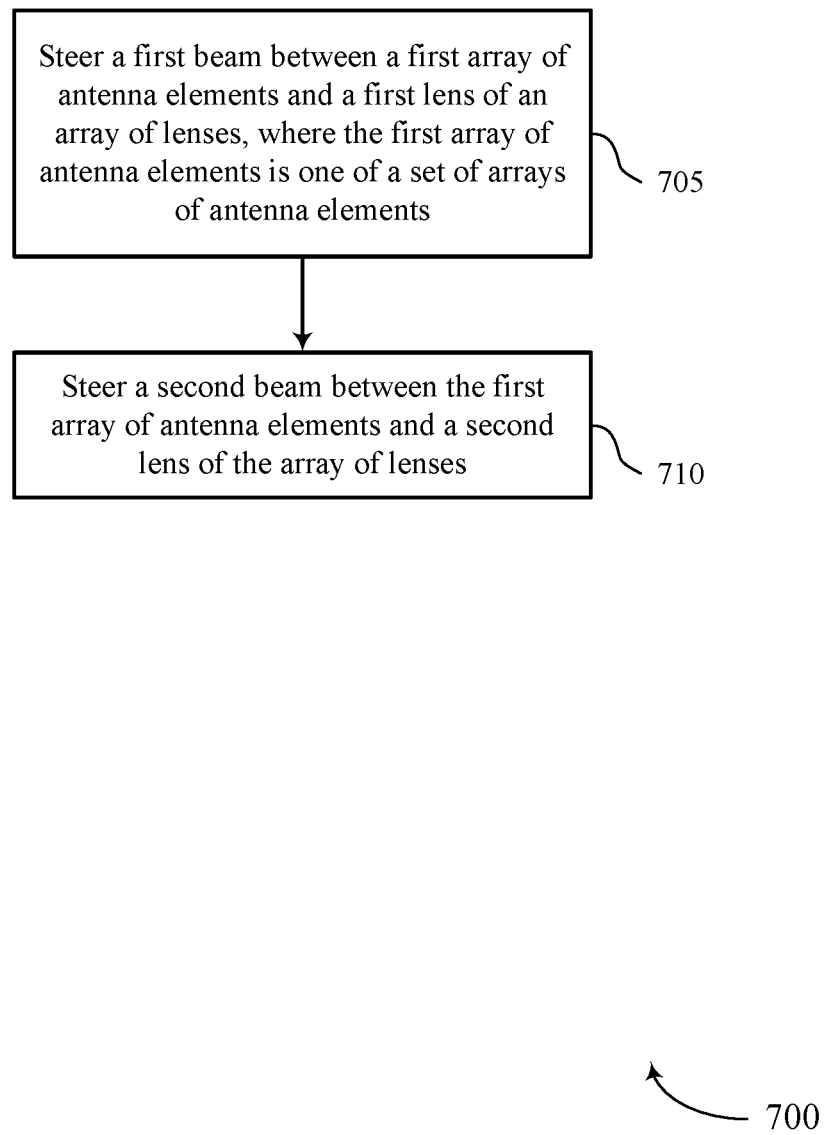
FIGS. 7 through 9 show flowcharts illustrating methods that support wireless communications using multiple antenna arrays and a lens array in accordance with aspects of the present disclosure.

FIG. 7 shows a flowchart illustrating a method 700 that supports wireless communications using multiple antenna arrays and a lens array in accordance with aspects of the present disclosure. The operations of method 700 may be implemented by a wireless device (e.g., a base station 105) or its components as described herein. For example, the operations of method 700 may be performed by a communications manager as described with reference to FIGS. 3 through 6. In some examples, a wireless device may execute a set of instructions to control the functional elements of the wireless device to perform the functions described below. Additionally or alternatively, a wireless device may perform aspects of the functions described below using special-purpose hardware.

At 705, the wireless device may steer a first beam between a first array of antenna elements and a first lens of an array of lenses, where the first array of antenna elements is one of a set of arrays of antenna elements. The operations of 705 may be performed according to the methods described herein. In some examples, aspects of the operations of 705 may be performed by a beam steering module as described with reference to FIGS. 3 through 6.

At 710, the wireless device may steer a second beam between the first array of antenna elements and a second lens of the array of lenses. The operations of 710 may be performed according to the methods described herein. In some examples, aspects of the operations of 710 may be performed by a beam steering module as described with reference to FIGS. 3 through 6.

Figure 8:
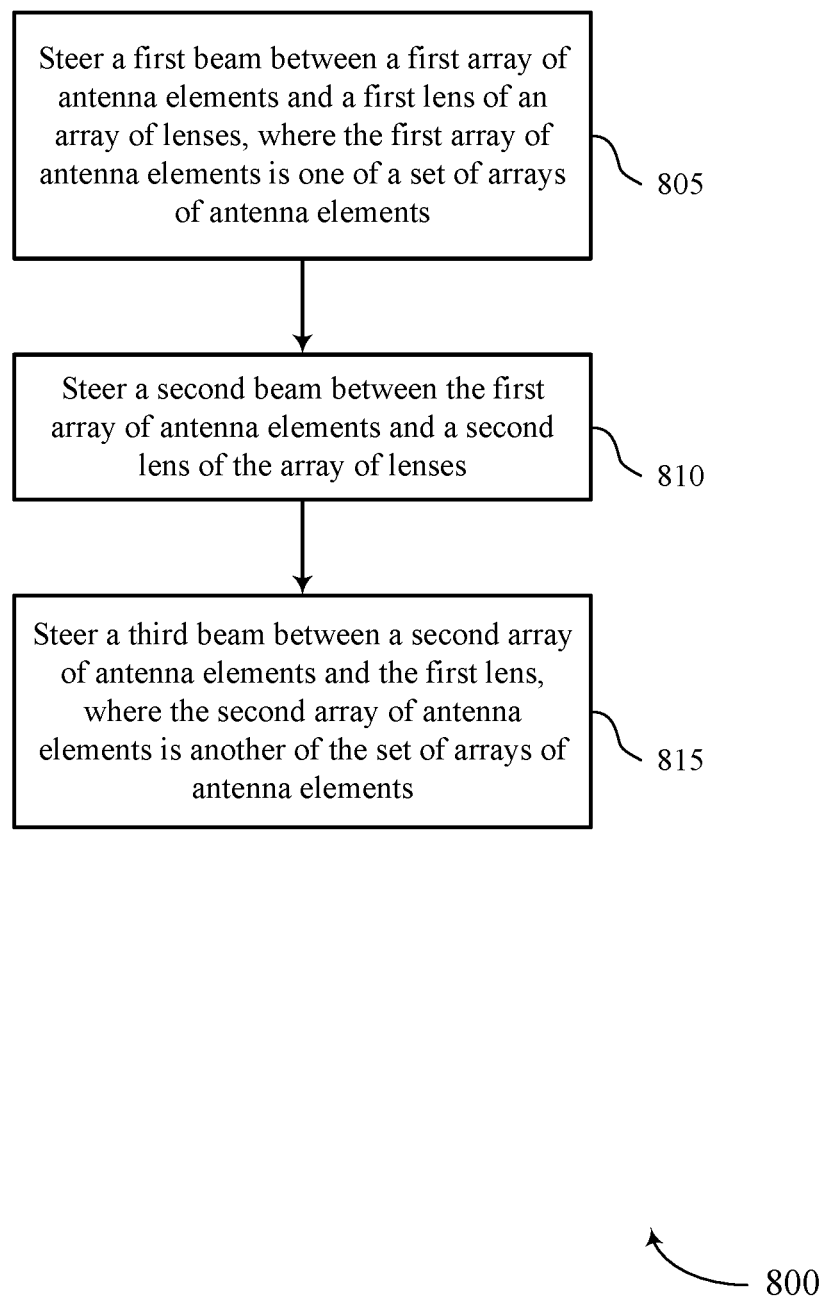

FIG. 8 shows a flowchart illustrating a method 800 that supports wireless communications using multiple antenna arrays and a lens array in accordance with aspects of the present disclosure. The operations of method 800 may be implemented by a wireless device (e.g., a base station 105) or its components as described herein. For example, the operations of method 800 may be performed by a communications manager as described with reference to FIGS. 3 through 6. In some examples, a wireless device may execute a set of instructions to control the functional elements of the wireless device to perform the functions described below. Additionally or alternatively, a wireless device may perform aspects of the functions described below using special-purpose hardware.

At 805, the wireless device may steer a first beam between a first array of antenna elements and a first lens of an array of lenses, where the first array of antenna elements is one of a set of arrays of antenna elements. The operations of 805 may be performed according to the methods described herein. In some examples, aspects of the operations of 805 may be performed by a beam steering module as described with reference to FIGS. 3 through 6.

At 810, the wireless device may steer a second beam between the first array of antenna elements and a second lens of the array of lenses. The operations of 810 may be performed according to the methods described herein. In some examples, aspects of the operations of 810 may be performed by a beam steering module as described with reference to FIGS. 3 through 6.

At 815, the wireless device may steer a third beam between a second array of antenna elements and the first lens, where the second array of antenna elements is another of the set of arrays of antenna elements. The operations of 815 may be performed according to the methods described herein. In some examples, aspects of the operations of 815 may be performed by a beam steering module as described with reference to FIGS. 3 through 6.

Figure 9:
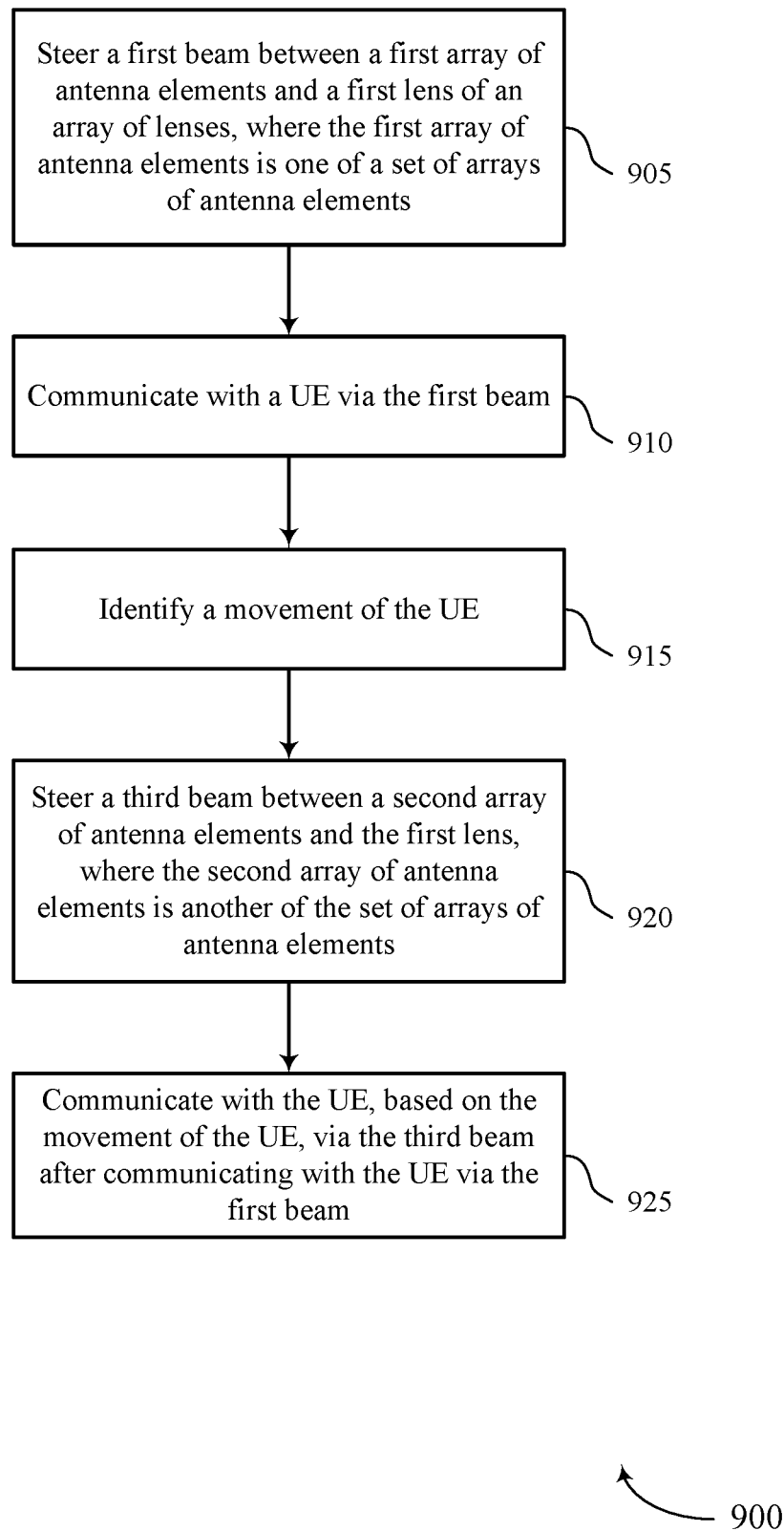

FIG. 9 shows a flowchart illustrating a method 900 that supports wireless communications using multiple antenna arrays and a lens array in accordance with aspects of the present disclosure. The operations of method 900 may be implemented by a wireless device (e.g., a base station 105) or its components as described herein. For example, the operations of method 900 may be performed by a communications manager as described with reference to FIGS. 3 through 6. In some examples, a wireless device may execute a set of instructions to control the functional elements of the wireless device to perform the functions described below. Additionally or alternatively, a wireless device may perform aspects of the functions described below using special-purpose hardware.

At 905, the wireless device may steer a first beam between a first array of antenna elements and a first lens of an array of lenses, where the first array of antenna elements is one of a set of arrays of antenna elements. The operations of 905 may be performed according to the methods described herein. In some examples, aspects of the operations of 905 may be performed by a beam steering module as described with reference to FIGS. 3 through 6.

At 910, the wireless device may communicate with a UE via the first beam. The operations of 910 may be performed according to the methods described herein. In some examples, aspects of the operations of 910 may be performed by a beam steering module as described with reference to FIGS. 3 through 6.

At 915, the base station may identify a movement of the UE. The operations of 915 may be performed according to the methods described herein. In some examples, aspects of the operations of 915 may be performed by a movement identifying module as described with reference to FIGS. 3 through 6.

At 920, the wireless device may steer a third beam between a second array of antenna elements and the first lens, where the second array of antenna elements is another of the set of arrays of antenna elements. The operations of 920 may be performed according to the methods described herein. In some examples, aspects of the operations of 920 may be performed by a beam steering module as described with reference to FIGS. 3 through 6.

At 925, the wireless device may communicate with the UE, based on the movement of the UE, via the third beam after communicating with the UE via the first beam. The operations of 925 may be performed according to the methods described herein. In some examples, aspects of the operations of 925 may be performed by a beam steering module as described with reference to FIGS. 3 through 6.

The following provides an overview of aspects of the present disclosure:

Aspect 1: A method for wireless communication, comprising: steering a first beam between a first array of antenna elements and a first lens of an array of lenses, wherein the first array of antenna elements is one of a plurality of arrays of antenna elements; and steering a second beam between the first array of antenna elements and a second lens of the array of lenses.

Aspect 2: The method of aspect 1, further comprising: steering a third beam between a second array of antenna elements and the first lens, wherein the second array of antenna elements is another of the plurality of arrays of antenna elements.

Aspect 3: The method of aspect 2, wherein the first beam is steered between the first array of antenna elements and the first lens concurrent with the third beam being steered between the second array of antenna elements and the first lens.

Aspect 4: The method of aspect 3, further comprising: communicating with a first UE via the first beam; and communicating with the first UE via the second beam.

Aspect 5: The method of any of aspects 2 through 4, further comprising: communicating with a UE via the first beam; identifying a movement of the UE; and communicating with the UE, based at least in part on the movement of the UE, via the third beam after communicating with the UE via the first beam.

Aspect 6: The method of aspect 5, further comprising: identifying a second movement of the UE; and communicating with the UE, based at least in part on the second movement of the UE, via the second beam after communicating with the UE via the third beam.

Aspect 7: The method of any of aspects 1 through 6, wherein the first beam is steered between the first array of antenna elements and the first lens concurrent with the second beam being steered between the first array of antenna elements and the second lens.

Aspect 8: The method of aspect 7, further comprising: communicating with a first UE via the first beam; and communicating with a second UE via the second beam.

Aspect 9: The method of any of aspects 1 through 8, further comprising: communicating, during a first time period, via the first beam using a first quantity of antenna elements within the first array of antenna elements; and communicating, during a second time period, via a fourth beam using a second quantity of antenna elements within the first array of antenna elements.

Aspect 10: The method of aspect 9, further comprising: identifying, between the first time period and the second time period, a change in target transmit power associated with the first array of antenna elements, wherein changing from using the first quantity of antenna elements to using the second quantity of antenna elements is based at least in part on the change in target transmit power.

Aspect 11: The method of any of aspects 9 through 10, further comprising: changing from using the first quantity of antenna elements to using the second quantity of antenna elements based at least in part on deactivating a first antenna element and a second antenna element respectively disposed at a first edge and a second edge of the first array of antenna elements; or changing from using the first quantity of antenna elements to using the second quantity of antenna elements based at least in part on deactivating a first subset of antenna elements that is interleaved with a second subset of antenna elements within the first array of antenna elements, wherein the second quantity comprises the second subset of antenna elements.

Aspect 12: The method of any of aspects 1 through 11, wherein a distance between the first array of antenna elements and each lens of the array of lenses is greater than a far field length for the first array of antenna elements.

Aspect 13: The method of any of aspects 1 through 12, wherein each lens of the array of lenses has a respective diameter; and a width of the first array of antenna elements is smaller than the respective diameter of each lens of the array of lenses.

Aspect 14: The method of any of aspects 1 through 13, wherein the array of lenses comprises a two-dimensional array of lenses; the first lens and the second lens are aligned along a first dimension; and the first lens and a third lens of the array of lenses are aligned along a second dimension.

Aspect 15: An apparatus for wireless communication, comprising a processor;

memory coupled with the processor; and instructions stored in the memory and executable by the processor to cause the apparatus to perform a method of any of aspects 1 through 14.

Aspect 16: An apparatus for wireless communication, comprising at least one means for performing a method of any of aspects 1 through 14.

Aspect 17: A non-transitory computer-readable medium storing code for wireless communication, the code comprising instructions executable by a processor to perform a method of any of aspects 1 through 14.

Aspect 18: An apparatus, comprising: an array of lenses that comprises a first lens and a second lens; and a plurality of antenna element arrays, wherein a first antenna element array of the plurality comprises: a plurality of antenna elements; and phase shifting circuitry operable to steer a first beam between the first antenna element array and the first lens and to steer a second beam between the first antenna element array and the second lens.

Aspect 19: The apparatus of aspect 18, further including: wherein a second antenna element array of the plurality comprises: a second plurality of antenna elements; and second phase shifting circuitry operable to steer a third beam between the second antenna element array and the first lens and to steer a fourth beam between the second antenna element array and the second lens.

Aspect 20: The apparatus of any of aspects 18 through 19, wherein the phase shifting circuitry is operable to steer the first beam between the first antenna element array and the first lens concurrent with steering the second beam between the first antenna element array and the second lens.

Aspect 21: The apparatus of any of aspects 18 through 20, wherein each antenna element array of the plurality is operable to concurrently steer a respective beam in a respective direction corresponding to the first lens.

Aspect 22: The apparatus of any of aspects 18 through 21, wherein each antenna element array of the plurality is operable to concurrently steer a respective plurality of beams, each beam of the respective plurality corresponding to a respective lens of the array of lenses.

Aspect 23: The apparatus of any of aspects 18 through 22, further comprising:
control circuitry coupled with the plurality of antenna element arrays, wherein the control circuitry is configured to: identify a first movement of a UE, wherein the first beam is associated with the UE; cause the first antenna element array, based at least in part on the first movement of the UE, to cease steering the first beam between the first antenna element array and the first lens; and cause a second antenna element array of the plurality, based at least in part on the first movement of the UE, to steer a third beam between the second antenna element array and the first lens, wherein the third beam is associated with the UE.

Aspect 24: The apparatus of aspect 23, wherein the control circuitry is further configured to: identify a second movement of the UE; cause the second antenna element array, based at least in part on the second movement of the UE, to cease steering the third beam between the second antenna element array and the second lens; and cause the first antenna element array, based at least in part on the second movement of the UE, to steer the second beam between the first antenna element array and the second lens, wherein the second beam is associated with the UE.

Aspect 25: The apparatus of any of aspects 18 through 24, wherein a distance between the first antenna element array and each lens of the array of lenses is greater than a far field length for the first antenna element array.

Aspect 26: The apparatus of any of aspects 18 through 25, wherein: each lens of the array of lenses has a respective diameter; and a width of the first antenna element array is smaller than the respective diameter of each lens of the array of lenses.

Aspect 27: The apparatus of any of aspects 18 through 26, further comprising: a third lens of the array of lenses, wherein the array of lenses comprises a two-dimensional array of lenses, and wherein: the first lens and the second lens are aligned along a first dimension; and the first lens and the third lens are aligned along a second dimension.

Aspect 28: The apparatus of any of aspects 18 through 27, further comprising:
switching circuitry operable to deactivate a subset of the plurality of antenna elements within the first antenna element array; and control circuitry coupled with the first antenna element array and configured to cause the switching circuitry to deactivate the subset of the plurality of antenna elements based at least in part on an operating mode for the apparatus.

Aspect 29: The apparatus of aspect 28, wherein the subset of the plurality of antenna elements comprises: a first antenna element and a second antenna element respectively disposed at a first edge and a second edge of the first antenna element array; or a first subset of antenna elements that is interleaved with a second subset of antenna elements within the first antenna element array.

Aspect 30: The apparatus of any of aspects 28 through 29, wherein the plurality of antenna element arrays are each configured to be reciprocal with respect to transmission and reception of signals.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   steering a first beam between a first array of antenna elements and a first lens of an array of lenses, wherein the first array of antenna elements is one of a plurality of arrays of antenna elements; and
   steering, concurrently with the steering of the first beam, a second beam between the first array of antenna elements and a second lens of the array of lenses, wherein the second beam is different than the first beam.

2. The method of claim 1, further comprising:
   steering a third beam between a second array of antenna elements and the first lens, wherein the second array of antenna elements is another of the plurality of arrays of antenna elements.

3. The method of claim 2, wherein:
   the first beam is steered between the first array of antenna elements and the first lens concurrent with the third beam being steered between the second array of antenna elements and the first lens.

4. The method of claim 3, further comprising:
   communicating with a first user equipment (UE) via the first beam; and
   communicating with the first UE via the second beam.

5. The method of claim 2, further comprising:
   communicating with a user equipment (UE) via the first beam;

identifying a movement of the UE; and
communicating with the UE, based at least in part on the movement of the UE, via the third beam after communicating with the UE via the first beam.

6. The method of claim 5, further comprising:
identifying a second movement of the UE; and
communicating with the UE, based at least in part on the second movement of the UE, via the second beam after communicating with the UE via the third beam.

7. The method of claim 1, wherein:
the first beam is steered between the first array of antenna elements and the first lens based at least in part on a first position of a first user equipment (UE), wherein the second beam is steered between the first array of antenna elements and the second lens based at least in part on a second position of a second UE, and wherein the first position is different than the second position.

8. The method of claim 7, further comprising:
communicating with a first user equipment (UE) via the first beam; and
communicating with a second UE via the second beam.

9. The method of claim 1, further comprising:
communicating, during a first time period, via the first beam using a first quantity of antenna elements within the first array of antenna elements; and
communicating, during a second time period, via a fourth beam using a second quantity of antenna elements within the first array of antenna elements.

10. The method of claim 9, further comprising:
identifying, between the first time period and the second time period, a change in target transmit power associated with the first array of antenna elements, wherein changing from using the first quantity of antenna elements to using the second quantity of antenna elements is based at least in part on the change in target transmit power.

11. The method of claim 9, further comprising:
changing from using the first quantity of antenna elements to using the second quantity of antenna elements based at least in part on deactivating a first antenna element and a second antenna element respectively disposed at a first edge and a second edge of the first array of antenna elements; or
changing from using the first quantity of antenna elements to using the second quantity of antenna elements based at least in part on deactivating a first subset of antenna elements that is interleaved with a second subset of antenna elements within the first array of antenna elements, wherein the second quantity of antenna elements comprises the second subset of antenna elements.

12. The method of claim 1, wherein a distance between the first array of antenna elements and each lens of the array of lenses is greater than a far field length for the first array of antenna elements.

13. The method of claim 1, wherein:
each lens of the array of lenses has a respective diameter; and
a width of the first array of antenna elements is smaller than the respective diameter of each lens of the array of lenses.

14. The method of claim 1, wherein:
the array of lenses comprises a two-dimensional array of lenses;
the first lens and the second lens are aligned along a first dimension; and
the first lens and a third lens of the array of lenses are aligned along a second dimension.

15. An apparatus for wireless communication, comprising:
one or more memories storing processor-executable code; and
one or more processors coupled with the one or more memories and individually or collectively operable to execute the code to cause the apparatus to:
steer a first beam between a first array of antenna elements and a first lens of an array of lenses, wherein the first array of antenna elements is one of a plurality of arrays of antenna elements; and
steer, concurrently with first beam being steered, a second beam between the first array of antenna elements and a second lens of the array of lenses, wherein the second beam is different than the first beam.

16. The apparatus of claim 15, wherein the one or more processors are individually or collectively further operable to execute the code to cause the apparatus to:
steer a third beam between a second array of antenna elements and the first lens, wherein the second array of antenna elements is another of the plurality of arrays of antenna elements.

17. The apparatus of claim 16, wherein the one or more processors are individually or collectively further operable to execute the code to cause the apparatus to:
steer the first beam between the first array of antenna elements and the first lens concurrent with the third beam being steered between the second array of antenna elements and the first lens.

18. The apparatus of claim 15, wherein the one or more processors are individually or collectively further operable to execute the code to cause the apparatus to:
steer the first beam between the first array of antenna elements and the first lens based at least in part on a first position of a first user equipment (UE); and
steer the second beam between the first array of antenna elements and the second lens based at least in part on a second position of a second UE, wherein the first position is different than the second position.

19. The apparatus of claim 18, wherein the one or more processors are individually or collectively further operable to execute the code to cause the apparatus to:
communicate with a first user equipment (UE) via the first beam; and
communicate with a second UE via the second beam.

20. An apparatus for wireless communication, comprising:
means for steering a first beam between a first array of antenna elements and a first lens of an array of lenses, wherein the first array of antenna elements is one of a plurality of arrays of antenna elements; and
means for steering, concurrently with the steering of the first beam, a second beam between the first array of antenna elements and a second lens of the array of lenses, wherein the second beam is different than the first beam.

* * * * *